United States Patent [19]

Sugiura

[11] 4,411,246
[45] Oct. 25, 1983

[54] IGNITION SYSTEM AND METHOD FOR INTERNAL COMBUSTION ENGINE

[75] Inventor: Noboru Sugiura, Katsuta, Japan

[73] Assignee: Hitachi, Ltd., Tokyo, Japan

[21] Appl. No.: 200,574

[22] Filed: Oct. 24, 1980

[30] Foreign Application Priority Data

Oct. 26, 1979 [JP] Japan ................................ 54-137685

[51] Int. Cl.³ .............................................. F02P 1/00
[52] U.S. Cl. .................................... 123/644; 123/609; 123/611
[58] Field of Search ........................ 123/609, 611, 644

[56] References Cited

U.S. PATENT DOCUMENTS

| | | | |
|---|---|---|---|
| 4,106,447 | 8/1978 | West | 123/644 |
| 4,248,200 | 2/1981 | Sugiura et al. | 123/644 |
| 4,280,461 | 7/1981 | Okuda | 123/644 |
| 4,308,848 | 1/1982 | Pfaff | 123/644 |

*Primary Examiner*—Ronald B. Cox
*Attorney, Agent, or Firm*—Antonelli, Terry & Wands

[57] ABSTRACT

An ignition system for the internal combustion engine is provided wherein a retard start timing and a conduction start timing are provided on the basis of an electrical signal produced from a pick-up coil. An ignition timing is provided at a time point following a retard time determined from the retard start timing in accordance with the engine operating conditions while advancing the retard start timing in accordance with the engine r.p.m. Before the lapse of a cut-off period of the ignition coil current required for producing a required ignition pulse, the cut-off state of the ignition coil current is maintained and the conduction start timing is prevented from advancing before the time point immediately following the lapse of the cut-off period.

16 Claims, 11 Drawing Figures

IGNITION SYSTEM AND METHOD FOR INTERNAL COMBUSTION ENGINE

BACKGROUND OF THE INVENTION

1. Field of the Invention

This invention relates to an ignition system for the internal combustion engine or more in particular to an ignition system having a retard circuit.

2. Description of the Prior Art

The conventional ignition systems are such that the ignition is performed by turning on and off a power transistor. With the increase in the retard angle, a first-stage transistor may sometimes cause the power transistor to turn on immediately following the turning off thereof, in which case the primary current fails to be cut off, thereby leading to the troubles of a firing failure or an interrupted firing.

For overcoming such problems, there has been provided a conventional ignition system having a retard circuit such as disclosed by U.S. Pat. No. 4,106,447, in which pulses are generated in response to an output signal (coincident with the ignition timing) of a retard circuit for a predetermined period of time during which the ignition coil is forcibly turned off.

This type of conventional ignition system requires an electromagnetic pick-up coil voltage waveform processing circuit for both the ignition system and the retard circuit, resulting in a bulky total system on the one hand and complicating the control circuit for the retard circuit on the other hand.

The U.S. patent application Ser. No. 44,998 dated Jan. 4, 1979, now U.S. Pat. No. 4,248,200, issued Feb. 3, 1981, discloses a circuit for increasing the duty factor (ignition coil conduction time/period)×100%) depending on the r.p.m. of the engine, a circuit for limiting the current of a power transistor, a circuit for turning on the power transistor under non-saturated conditions and a circuit for reducing the duty factor depending on the non-saturation time. This particular circuit, however, does not disclose any means for preventing an ignition failure by limiting the increase of the duty factor.

SUMMARY OF THE INVENTION

Accordingly, it is the object of the present invention to provide an ignition system for an internal combustion engine comprising a retard device and a duty factor increasing device, wherein an ignition failure is prevented from occurring with an increase in the retard angle.

According to the present invention, there is provided an ignition system for an internal combustion engine, comprising a device for generating an AC signal in synchronism with the engine revolutions, a device for providing an ignition coil current conduction start timing and a retard start timing on the basis of the AC signal, a device for providing an ignition timing at a time point delayed from the retard start timing by a retard time depending on the engine operating condition, a device for advancing the current conduction start timing in accordance with the increase in the number of engine revolutions per unit time, a device so operated that the current conduction in the ignition coil is started at the current conduction start timing and the current is cut off at the ignition timing, and a device for preventing the conduction start timing from being provided for a predetermined period of time following the ignition timing and for preventing the current conduction start timing from advancing before the predetermined period of time.

DESCRIPTION OF THE PREFERRED EMBODIMENTS

Figure 1:
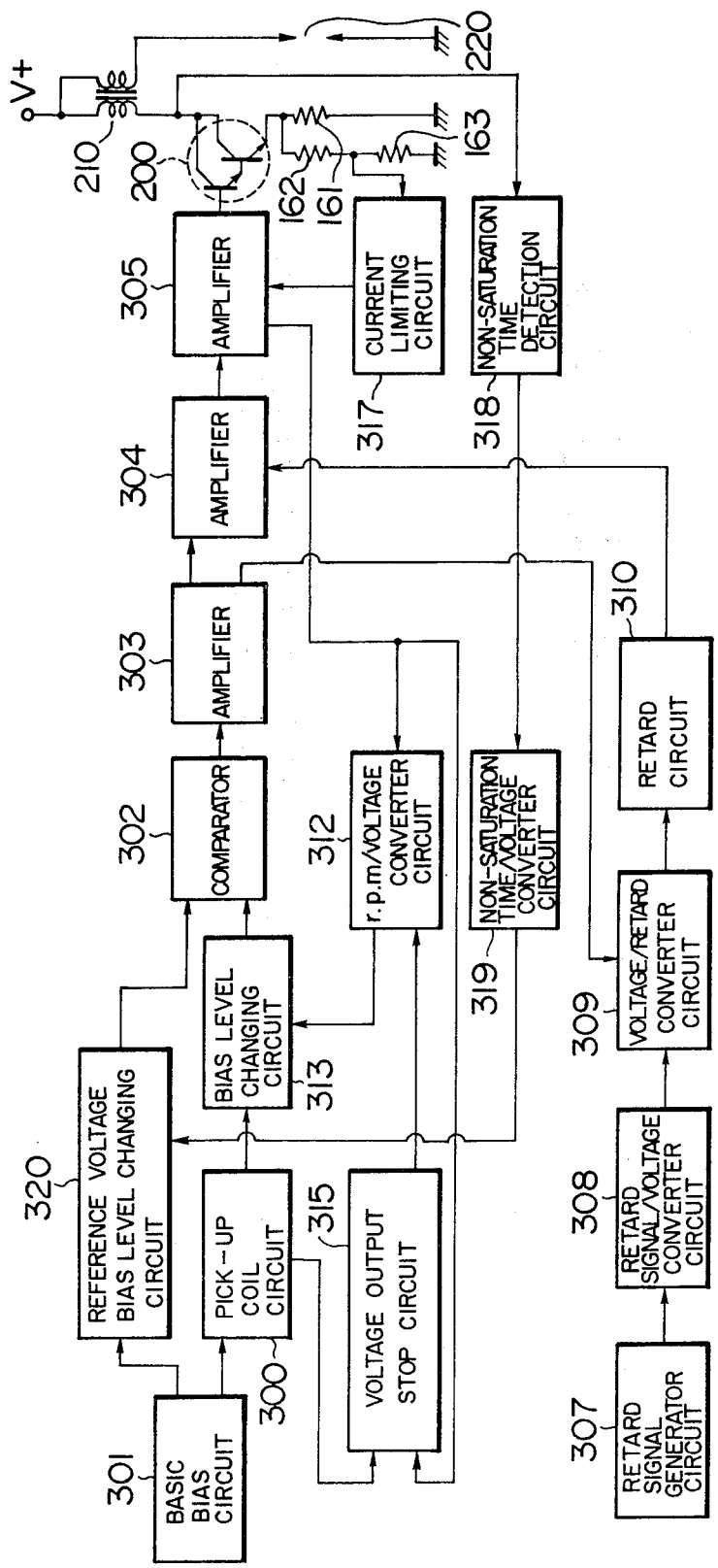
FIG. 1 is a block diagram showing an embodiment of the current control circuit for the ignition system according to the present invention.

A configuration of the present invention will be described generally with reference to FIG. 1. The pick-up coil circuit 300 generates an AC electrical signal repeated in synchronism with the rotation of the internal combustion engine. A basic bias circuit 301 is for providing a stable DC reference voltage level. A comparator 302 has one input terminal thereof impressed with an AC signal from the pick-up coil circuit 300 superimposed on the DC level from the basic bias circuit 301, and the other input terminal thereof impressed with the DC reference voltage from the basic bias circuit 301, thus producing a rectangular wave with a high level during the period when the AC signal is higher than the reference voltage. This rectangular wave signal is amplified by amplifiers 303, 304 and 305 and supplied to a power transistor 200. The leading edge of this rectangular wavesignal is used as a conduction start timing signal and the trailing edge thereof as a retard start timing signal.

A retard signal generator circuit 307 is for detecting a knock of the engine and producing a retard signal corresponding to the intensity and number of the knocks. The retard signal is converted into a DC signal by a retard signal/voltage converter circuit 308, which DC signal is applied to a voltage/retard angle converter circuit 309. This converter circuit 309 detects the retard start timing signal from the amplifier 303 and provides a retard time signal depending on the DC voltage from the converter circuit 308 from this timing point. The retard circuit 310 provides an ignition timing signal at a time point following the lapse of the retard time, which ignition timing signal is supplied to the amplifier 304. The amplifier 304 is so configured that the fall time trailing edge of the rectangular wave, namely, the retard start timing signal is delayed with respect to this ignition timing signal.

The r.p.m./voltage converter circuit 312 is impressed with pulses proportional to the engine r.p.m. obtained at the amplifier 305 and produces a voltage proportional to the r.p.m. This voltage is applied to a bias level changing circuit 313 for increasing the DC level of the AC signal from the pick-up coil circuit 300. As a result, at the output of the comparator 302, the conduction start timing signal is advanced thereby to increase the duty factor.

The voltage output stop circuit 315 is for detecting the ignition tming signal produced from the amplifier 305, counts a predetermined ignition time from the time point of the detection, and prevents the voltage for increasing the duty factor from being applied to the bias level changing circuit 313 from the r.p.m./voltage converter circuit 312 during the period from the time point when the AC signal from the pick-up coil circuit 300 exceeds a comparatively high predetermined level to the end of the ignition time. Thus, the duty factor is prevented from increasing for a predetermined time from the ignition timing, thus preventing the conduction start timing from being advanced before the lapse of the ignition time.

The current begins to flow in the ignition coil 210 at the conduction start timing and is cut off at the ignition timing, so that the ignition plug 220 is fired by a high voltage induced in the secondary coil. The ignition coil current flows through resistors 161, 162 and 163. The emitter voltage of the power transistor 200 is divided by the resistors 162 and 163 and the divided voltage is applied to the current limiting circuit 317. This divided voltage has a magnitude proportional to the ignition coil current. Thus, the current limiting circuit 317 detects that a sufficient ignition coil current to produce an ignition voltage is obtained and the output of the current limiting circuit 317 is negatively fed back to the amplifier 305, thereby limiting the collector current of the power transistor 200 to a predetermined critical current. While this limiting function is effective, the transistor 200 is turned on under non-saturated conditions and the internal resistance thereof increases, thus increasing the collector voltage thereof.

The period during which the power transistor 200 is conducting under non-saturated conditions coincides with the time period during which the collector voltage thereof is high. Therefore, a non-saturation time detector circuit 318 detects the non-saturation time from the collector of the power transistor 200, which time is converted into a voltage of proportional magnitude at the non-saturation time/voltage converter circuit 319. This non-saturation time voltage is applied to a voltage bias level changing circuit 320 thereby to increase the level of the reference voltage supplied to the comparator 302, and in this way functions to delay the conduction start timing signal obtained at the output terminal of the comparator 302. As a result, the unrequired ignition coil current which otherwise might be applied after production of the predetermined ignition coil current is prevented from flowing in the ignition coil.

A specific circuit according to the present invention will be described below with reference to FIG. 2.

First, a current circuit used in this circuit will be described. A resistor 127 and a transistor 12 set in advance a current which provides a reference. The collector current of the transistor 11 is set at a value smaller than the collector current of the transistor 12 by the value of the resistor 123, and the value thus set undergoes a less change than the collector current of the transistor 12 with respect to the source voltage variation.

A current substantially equal to the collector current of the transistor 11 flows in a PNP transistor 83. The collector current of the PNP transistor 81 is smaller than the collector current of the PNP transistor 83 due to the value of the resistor 122 and is stable against the voltage change. The PNP transistor 82 is inserted for the purpose of reducing the difference between the currents flowing in the emitter and the collector of the PNP transistor 83. This assures a smooth design of the collector current of each transistor which otherwise might be hampered by the direct flow of the base current of the PNP transistors 86, 78, 79, 80, 81 and 91 to the collector of the PNP transistor in view of the fact that the value $h_{FE}$ of the PNP transistor in a monolithic IC is very small.

Figure 2:
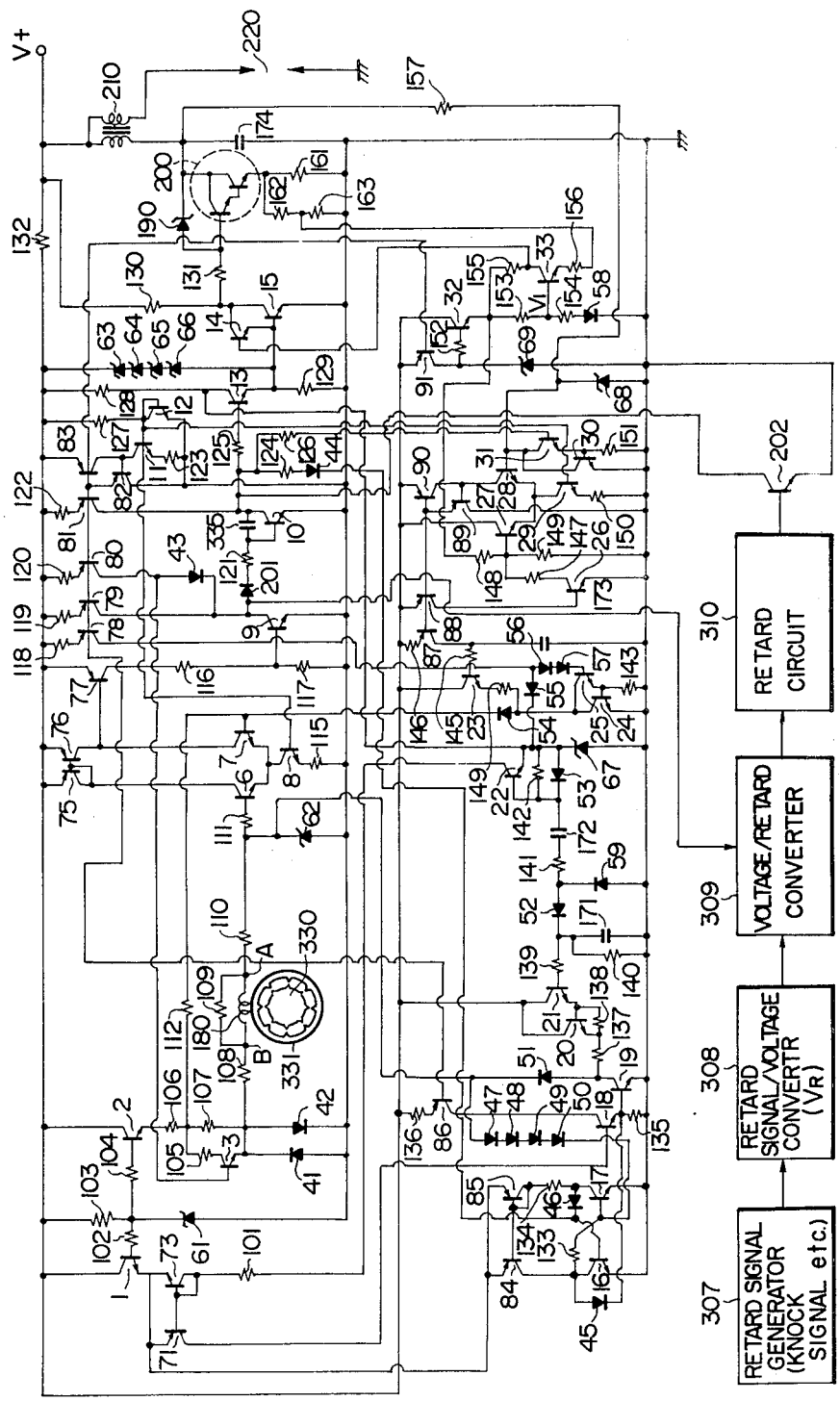
FIG. 2 is a circuit diagram showing a specific example of the embodiment of FIG. 1.

As what is called a constant current absorption circuit with a pair of NPN transistors as described above, transistor pairs of 12, 11; 12, 8; and 12, 29 are used in the circuit of FIG. 2. The collector current of the transistors 11, 8 and 29 does not change greatly with a voltage change.

A constant current flow-out circuit using a pair of PNP transistors, on the other hand, includes PNP transistor pairs 83, 81; 83, 80; 83, 79; 83, 78; 83, 86; 83, 91; 90, 88; 90, 87; 73, 71; or 75, 76, the operation of which is reverse to the constant current absorption circuit with the NPN transistors.

If a monolithic IC (MIC) is used as the abovementioned constant-current circuit, the area occupied by the internal elements of MIC is greatly reduced.

First, explanation will be made about the case in which a retard signal is not applied. In this case, the transistor 202 is normally off. The picked-up coil 180 electromagnetically reacts with a magnetic pole shoe 331 mounted on a rotary member 330 rotating in synchronism with the internal combustion engine, so that an AC voltage alternating between positive and negative levels as shown in FIG. 3(a) is generated at termianl A of the pick-up coil 180 with respect to terminal B thereof, thus supplying current to the base of the NPN transistor 6 through resistors 110 and 111. The terminal B of the pick-up coil 180 is connected via the resistor 108 to the anode of the diode 42, which is held at a constant voltage by the current flowing through the zener diode 61, the resistor 104, the transistor 2, and the resistors 106 and 107.

The base of the transistor 7 connected to the reference side of the comparator circuit is connected to a middle point between the resistors 106 and 107 through the resistor 112, and is biased at a constant voltage during engine stop.

With the start of the engine, a positive voltage is generated at terminal A of the pick-up coil 180. When the base voltage of the NPN transistor 6 exceeds the base voltage of the NPN transistor 7, a current flows in the PNP transistors 75 and 76. The PNP transistor 77 is turned off, the NPN transistor 9 is turned off, the NPN transistor 10 is turned on, the NPN transistors 13 and 15 are turned off, the power transistor 200 is turned on, and thus the primary current flows in the ignition coil 210.

With the decrease in the base voltage of the NPN transistor 6 below the base potential of the NPN transistor 6 at the time point when the voltage generated at the terminal A of the pick-up coil 180 changes sharply from positive to negative level, the NPN transistor 7 conducts followed by the conduction of the NPN transistor 77, so that the transistor 9 is turned on, the transistor 10 is turned off, the transistors 13 and 15 are turned on, the power transistor 200 is turned off, and a high voltage is generated at the secondary terminal of the ignition coil 210, thus causing a spark discharge at the spark plug 220.

In response to the turning off of the transistor 9, the current determined by the PNP transistor 80 and the resistor 120 is supplied to the base of the NPN transistor 3 and the voltage at the middle point between the resistors 106 and 107 is reduced by several 10 mV. The base voltage of the transistor 7 on the reference voltage side of the comparator circuit decreases, thus promoting the conductive state of the transistor 6. When the transistor 9 is turned on, the NPN transistor 3 is turned off so that the middle point voltage between the resistors 106 and 107 is increased thereby to promote the conductive state of the NPN transistor 7.

When the primary current of the ignition coil flows in the power transistor 200, a voltage responsive to the primary current is generated in the current detecting resistor 161, thus generating a voltage divided by the current detecting resistors 162 and 163 at a middle point therebetween.

The middle point between the current detecting resistors 162 and 163 is connected to the emitter of the NPN transistor 33 through the resistor 156. The collector of the NPN transistor 33 is connected to the base of the transistor 14, while the base of the transistor 33 is connected to a middle point between the resistors 153 and 154, which middle point provides a constant voltage obtained by dividing the voltage of the zener diode 69 by the resistors 153 and 154.

The zener diode 69 is connected to the base of the transistor 32 through the resistor 152. The resistor 152 is small in value and is provided for preventing the oscillation of the emitter-follower circuit. The middle point voltage $V_1$ between the resistors 153 and 154 is set at the value shown below.

$$V_1 = \frac{R_{154}}{R_{153} + R_{154}} (V_Z - 2V_{BE}) + V_{BE}$$

where $V_Z$ is the zener voltage of the zener diode 69, and $V_{BE}$ the base-emitter voltage of the transistor 32 or the forward voltage of the diode 58.

Specifically, when the voltage at the middle point between the current detecting resistors 162 and 163 increases to a level substantially equal to the voltage at the middle point between the resistors 153 and 154, the NPN transistor 33 transfers to an active state for amplification from the on state, so that current is supplied to the base of the transistor 14, thus turning on the transistor 14. With the turning on of the transistor 14, the transistor 15 is also turned on and the base current of the power transistor 200 is reduced, thus placing the power transistor into a non-saturated state.

In other words, by placing the power transistor 200 from a saturated state into a non-saturated state, the maximum value of the primary current is controlled at a constant level. The diode 58 has the same temperature coefficient as that of the base-emitter voltage $V_{BE}$ of the transistor 33 and is inserted for the purpose of temperature compensation therefor. The resistor 156, on the other hand, is inserted for the purpose of protecting the transistor 33 when the potential at the middle point between the current detecting resistors 162 and 163 drops below a surge voltage. The Darlington connection of the transistors 14 and 15 makes it possible to increase the value of the resistor 155, and therefore in the case where the control circuit is comprised of a monolithic IC (hereinafter referred to as MIC), the power of the MIC may be reduced greatly. The same current flows in the collector of the PNP transistor 91 connected to the cathode of the zener diode 69 as in the collector of the PNP transistor 83 having a common base, thus making it possible to supply the required current to the zener diode 69 even when the source voltage is low. Also, in view of the fact that the zener diode 69 is connected to the transistor 32 of emitter-follower type, the load impedance of the zener diode 69 is very large and therefore the decrease in the zener voltage is small even at a low voltage. Thus the decrease in the voltage at the middle point between the resistors 153 and 154 is small, thereby permitting the variation in the critical value of the primary current of the ignition coil to be reduced in the range from low to high voltage.

Assume that the power transistor transfers from saturated to non-saturated state, that the collector voltage of the power transistor increases, and that the base voltage of the transistor 28 exceeds the base voltage of the transistor 27, namely, the middle point voltage between the resistors 148 and 149. The transistor 28 conducts in view of the fact that the transistor 28 is connected to the collector of the power transistor through the resistor 157.

The collector current of the NPN transistor 29 which depends on the constant current system of the resistors 150, 127 and the transistor 12 slightly increases to about 100 μA for the source voltage rise of 12 V and to about 120 μA for a similar rise of 16 V.

When the power transistor 200 is off, the transistor 10 is off and the NPN transistors 30 and 31 are on. Therefore, the transistor 28 is off. With the power transistor 200 conducting in non-saturated state, the transistor 28 conducts. With the conduction of the transistor 28, the PNP transistors 89 and 90 conduct, so that the PNP transistors 87 and 88 also conduct. With the conduction of the transistor 88, the NPN transistor 26 conducts and the middle point voltage between the resistors 148 and 149 is reduced, with the result that the conduction of the transistor 28 is stabilized. The collector current of the PNP transistor 87 is smaller than the collector current of the PNP transistor 90 due to the resistor 146, so that the dependency to some degree of the collector current of the transistor 90 on the source voltage leads to the fact that the collector current of the transistor 87 depends to some degree on the source voltage.

When the transistor 87 conducts, electric charges are stored in the capacitor 173. Specifically, if the non-saturation time of the power transistor is long, the terminal voltage of the capacitor 173 is high with respect to the engine r.p.m.

The terminal voltage of the capacitor 173 is fed back to the base of the transistor 7 through the transistor 23 of emitter-follower type, the resistor 145 and the diode 54. When the terminal voltage of the capacitor 173 is high, the base voltage of the transistor 7 is also high. During the period when the power transistor 200 is conducting, namely, during the period when the transistor 13 is off, the diode 55 is impressed with a reverse voltage and therefore the transistors 24 and 25 are on. Thus the terminal voltage of the capacitor 173 is not fed back to the base of the transistor 7. This is for the purpose of preventing the timing for determining the ignition time from changing which otherwise might occur with the change in the reference voltage of the comparator circuit, namely, with the change in the reference voltage caused by a change in the source voltage for the same engine r.p.m. when the power transistor 200 is conducting.

With the increase in the non-saturation time of the power transistor caused by the above-mentioned operation, the terminal voltage of the capacitor increases and so does the base voltage of the transistor 7, with the result that the conduction start time point of the transistor 200 is delayed and the conduction time of the power transistor 200 is shortened, thus shortening the non-saturation time of the power transistor 200.

When the source voltage increases, on the other hand, the rise gradient of the primary current of the ignition coil increases, so that the conduction time before the primary current reaches a predetermined value shortens. As a result, the non-saturation time of the power transistor increases, resulting in an increase in the terminal voltage of the capacitor 173. The voltage generated in the pick-up coil does not change with the source voltage. Assume that a circuit constant minimizing the non-saturation time of the power transistor for the source voltage of 12 V is determined in the case where the collector current of the PNP transistor 87 is held constant against the source voltage. Therefore, if the non-saturation time of 5 msec is involved for the speed of 600 r.p.m. for a four-cylinder engine, for example, the non-saturation time of the power transistor is about 10 msec for the source voltage of 16 V. By increasing the current of the transistor 87 slightly with the increase in the source voltage for obtaining a non-saturation time near 10 msec, it is possible to attain the non-saturation time of the power transistor for the source voltage of 16 V not higher than twice that for the source voltage of 12 V.

Explanation will be made now of the r.p.m./voltage converter section 312. The AC voltage generated in the pick-up coil 180 contains about 50% each of the positive and negative cycles and therefore, the on duty of the power transistor 200 cannot be increased without taking some measures at the time of high engine speed.

The voltage generated in the pick-up coil, on the other hand, has a peak value much varied for the same engine r.p.m., and therefore a circuit permitting a stable output duty is required with such a pick-up coil. On the other hand, the voltage generated in the pick-up coil is such that in the case of the variation of ±40% in the peak value, a wave form variation occurs for about a 20% period near the peak but not for the remainder of the about 80% period. Therefore, by superimposing a pick-up coil voltage waveform stable against the r.p.m. on the DC voltage level, it is possible to produce a duty factor of about 80% even at the time of high engine speed.

Specifically, when the transistor 13 is turned off, current flows through a route including the resistor 128, the diode 53, the capacitor 172, the resistor 141, the diode 52 and the capacitor 171 in that order. The capacitor 171 is charged until a time point when the charge voltage of the capacitor 172 having a capacity about 1/10 that of the capacitor 171 increases sufficiently large to make the charge current thereof almost zero. When the transistor 13 is turned on, the charges stored in the capacitor 172 are released instantaneously through the diode 59, the resistor 141, the capacitor 172, the base-emitter of the transistor 22 and the transistor 13, except for the voltage $3V_{BE}$ equivalent to the sum of the three $V_{BE}$ of the diode 59, the transistor 22 and 15.

In view of the fact that the capacitor 172 is discharged each cycle regardless of the engine speed, the charging time of the capacitor 171 is substantially the same for any r.p.m. with the result that the terminal voltage of the capacitor 171 increases with the engine speed.

The terminal voltage of the capacitor 171 is applied to the base of the transistor 6 through the resistor 139, the transistors 21, 20, the resistor 137, the diode 51 and the resistor 111 in that order. In other words, even when the voltage generated at terminal A of the pick-up coil 180 is reduced to negative level at the time of high engine speed, the potential of the base of the transistor 6 impressed with the voltage charged in the capacitor 171 through the above-mentioned route exceeds the base potential of the transistor 7, so that the transistor 6 conducts and so does the power transistor 200, thus actuating the ignition coil 210. In this way, the duty factor of about 80% is obtained at the time of high engine speed.

The terminal voltage of the capacitor 171 has little pulsation at the time of high engine speed, and therefore if it is applied all the time to the base of the transistor 6, the angle determining the ignition point is delayed with the increase in r.p.m. As a result, a configuration is required which does not supply the output of the r.p.m./voltage converter circuit at or about the desired ignition point.

According to this embodiment, therefore, the output of the r.p.m./voltage converter circuit is not applied to the circuit connected with the pick-up coil 180 at the time point when the voltage generated in the pick-up coil reaches an appropriate positive level. Instead, such an output is applied to the circuit connected with the pick-up coil 180 after a predetermined time following the ignition.

Specifically, at the time point when the middle point voltage between the resistors 110 and 111 reaches the sum (about 3 V) of the base-emitter voltage of the transistor 17 and the anode-cathode voltages of the diodes 47, 48, 49 and 50, the transistor 17 is turned on while the transistor 16 is turned off. The transistor 19 is turned on through the PNP transistor 84 and the diode 45, thus preventing the charges from the capacitor 171 from flowing into the base of the transistor 6. In this way, the time point determining the ignition reference point is maintained constant regardless of the r.p.m. Further, the transistor 22 used in the r.p.m./voltage converter circuit is kept on for several 100 μsec after the turning on of the transistor 13, and during the conduction of the transistor 22, the transistors 71, 18 and 19 are sequentially turned on. As a result, the supply of the charges stored in the capacitor 171 to the pick-up coil is delayed, thereby preventing a firing failure which otherwise might occur by the chattering of the transistor 6.

Specifically, after an appropriate time following the elimination of the bias from the capacitor 171 to the pick-up coil 180, the transistor 6 is cut off, the transistor 9 conducts, and the transistor 10 is cut off. The transistor 16 conducts through the resistor 124 and the diode 44, thus stopping the supply of the current from the diode 45 to the transistor 19. At the same time the transistor 13 is turned on, the transistor 22 conducts, the PNP transistor 73 conducts, the PNP transistor 71 conducts, the transistor 18 conducts, and the current is supplied to the base of the transistor 19 through the PNP transistor 86. As a result, even after the current flowing in the diode 45 stops, the transistor 19 continues to conduct. The transistor 22 continues to conduct until the charges of the capacitor 172 are released. Since the capacity of the capacitor 172 is so small that the transistor 19 stops conducting within a short period of time (several hundred μsec).

The ignition of the ignition plug 220, on the other hand, is performed in such a manner that 20 to 30 μsec after the turning on of the transistor 15, the power transistor 200 is cut off, and after a further 40 to 50 μsec, the secondary voltage of the ignition coil reaches several 10 KV for ignition. That is to say, the ignition is started about 10 μsec after the conduction of the transistor 6 in the comparator circuit connected to the pick-up circuit 180.

If the battery connecting terminal comes off during the running of the engine, a voltage of 120 to 140 V may be applied to the source voltage terminal. In the event that the power transistor 200 conducts with this voltage generated, the power transistor 200 is instantaneously broken. In order to prevent this trouble, the zener diodes 63, 64, 65 and 66 conduct, the transistor 15 is turned on and the power transistor 200 is turned off, in the case where the source voltage reaches an abnormally high level.

Figure 3:
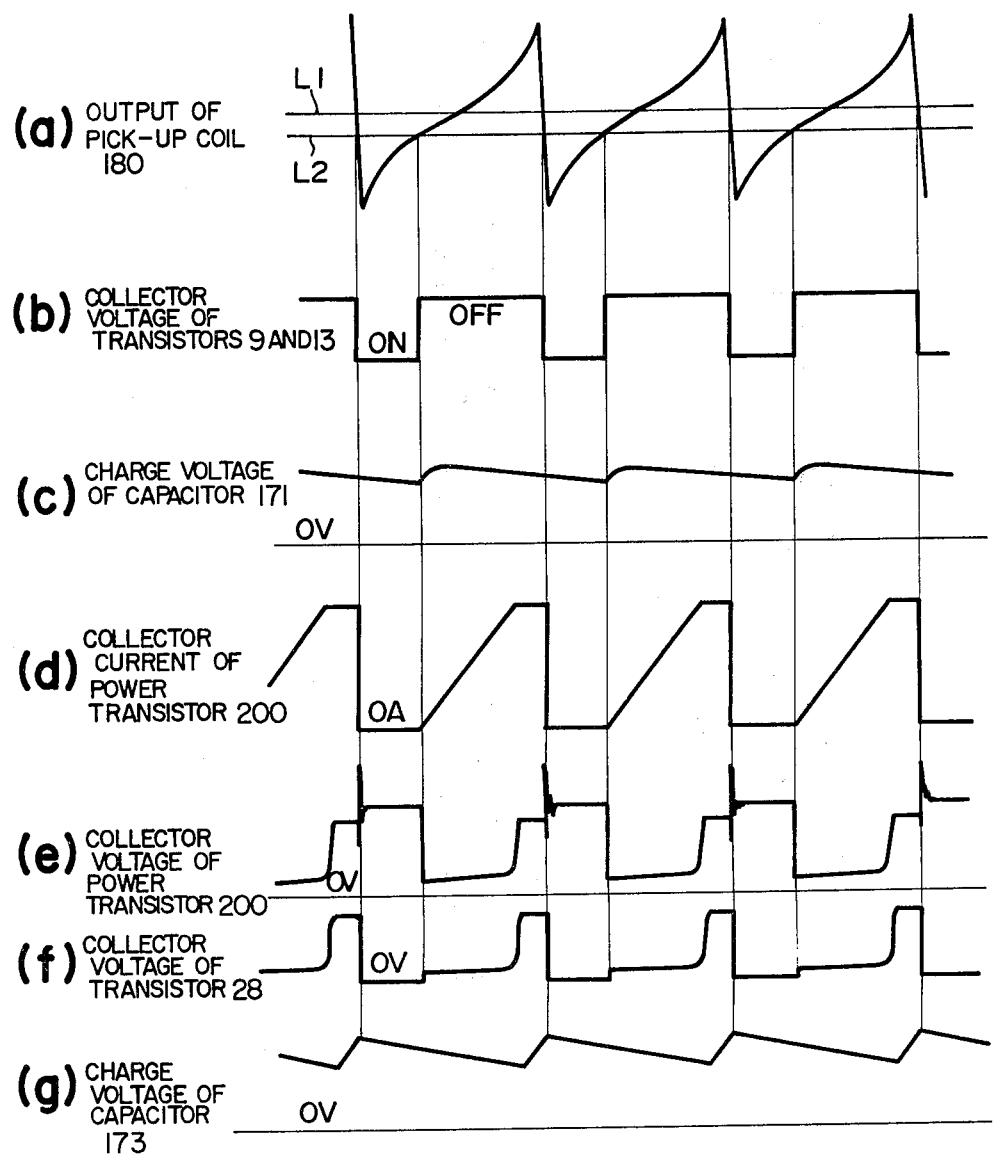
FIG. 3 shows waveforms produced at various parts of the circuit in FIG. 2.
Figure 4:
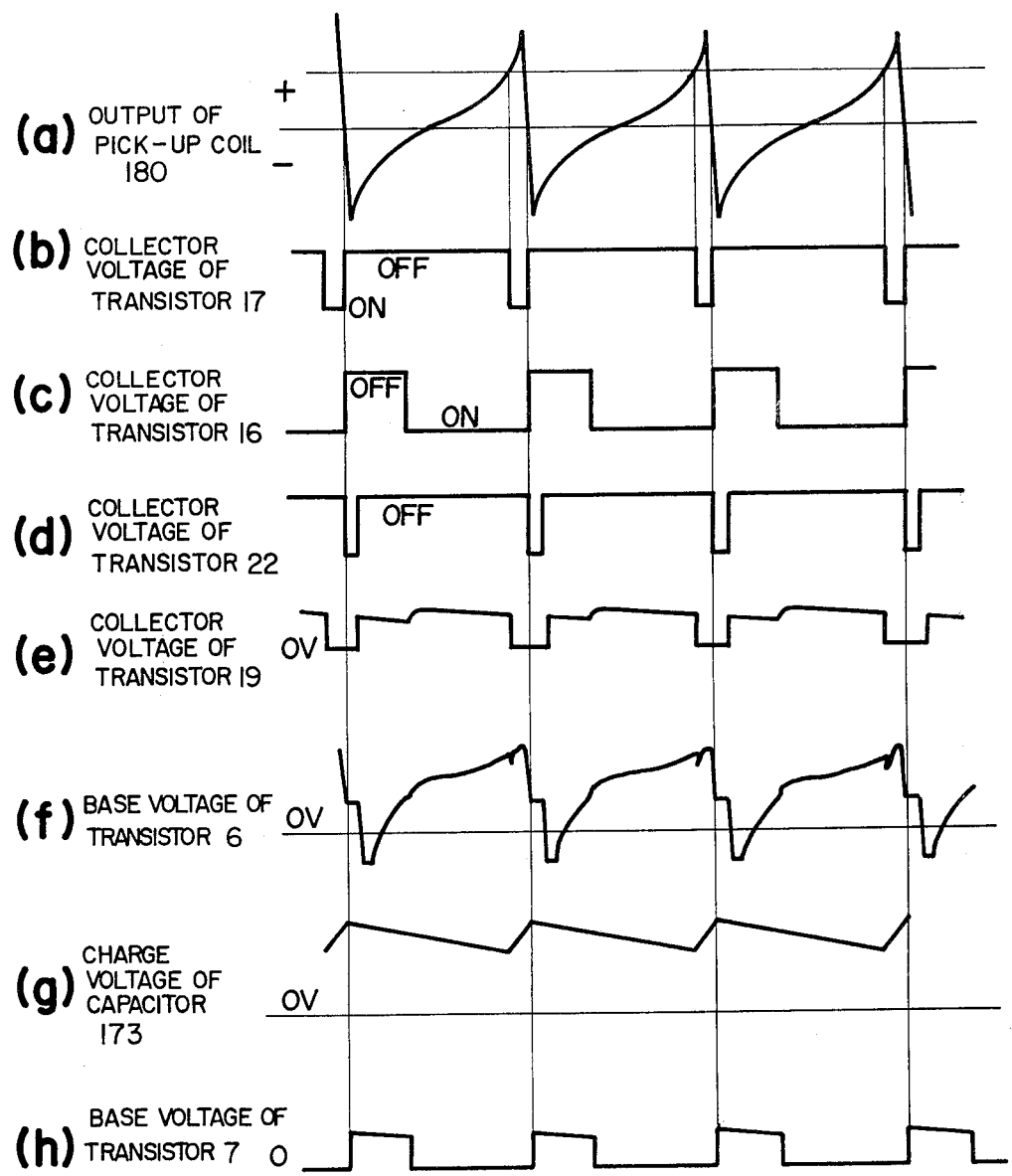
FIG. 4 shows waveforms produced at various parts of the circuit in FIG. 2.

The waveforms produced at various parts in the above-mentioned circuit operation will be described with reference to FIGS. 3 and 4.

An AC voltage as shown in FIG. 3(a) is generated at the terminal A with respect to the terminal B. This AC voltage is superimposed on the duty-increasing DC voltage and therefore the mean voltage level L1 thereof is higher than the reference voltage level L2. When the AC voltage level increases beyond the level L2, the transistor 6 conducts; and when the AC voltage level is reduced below the level L2, the transistor 6 is cut off. The collector voltage of the transistors 9 and 13 is as shown in FIG. 3(b), and the capacitor 171 is charged at the off timing of the transistor 13, so that the terminal voltage of the capacitor 171 is as shown in FIG. 3(c).

When the transistor 13 is in the off state, the power transistor 200 conducts, and the primary current flows in the ignition coil as shown in FIG. 3(d). When the primary current reaches an appropriate value, the current limiting circuit is actuated, thus keeping the primary current at a predetermined level. At this time, the collector voltage of the power transistor is in a non-saturated state as shown in FIG. 3(e). The collector voltage waveform of the transistor 28 for detecting this non-saturation time is as shown in FIG. 3(f), and the terminal voltage of the capacitor 173 of the non-saturation time/voltage converter circuit is as shown in FIG. 3(g).

FIG. 4(a) shows the same waveform as FIG. 3(a). When the voltage at point A takes an appropriate value, the transistor 17 conducts. The waveform of the collector voltage of the transistor 17 is as shown in FIG. 4(b), and the collector voltage of the transistor 10 is as shown in FIG. 4(c). Simultaneously with the turning off of the transistor 10, the transistor 16 is turned on. The transistor 22, however, conducts for an appropriate time and the collector voltage of the transistor 22 takes a waveform as shown in FIG. 4(d).

In other words, the collector voltage of the transistor 19 is as shown in FIG. 4(e). All these operations combine to produce a base voltage of the transistor 6 as shown in the waveform of FIG. 4(f).

FIG. 4(g) represents the same waveform as FIG. 3(g). In view of the fact that the transistor 24 is turned on during the period when the transistor 13 is off, the base voltage of the transistor 7 is as shown in FIG. 4(h).

Figure 5:
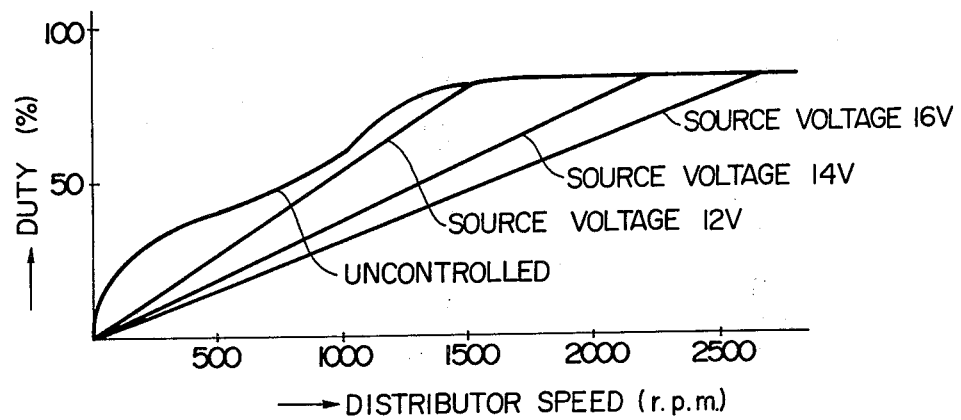
FIG. 5 is a diagram showing an r.p.m./duty characteristic of a distributor according to the present invention.

The diagram of FIG. 5 shows duty characteristics, namely, the ignition coil conduction time as against the r.p.m. of the distributor. The curve for the lack of control in FIG. 5 shows the characteristic in the absence of the output of the non-saturation time/voltage converter circuit which is to be applied to the reference voltage bias level changing circuit. The duty factor is reduced with the increase in the source voltage for the reason that the time required for the primary current to reach a predetermined value is reduced with the increase in the source voltage, resulting in an increased non-saturation time.

Figure 6:
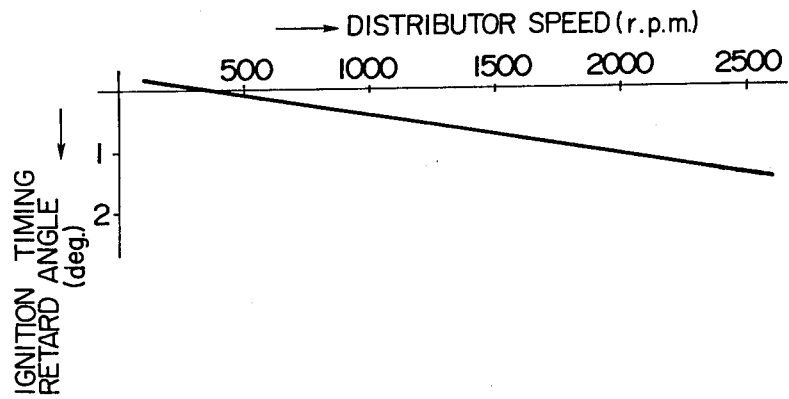
FIG. 6 is a diagram showing the relation between the distributor r.p.m. and the ignition timing retard angle according to the present invention.

The ignition time delay as related to the distributor r.p.m. is shown in FIG. 6. It is seen that the ignition time is delayed substantially along a straight line with the increase in r.p.m. This is because the sum of the above-mentioned cut-off time of the power transistor and the rise time of the ignition coil secondary voltage is as much as about 100 μsec, and the voltage output stop circuit restores the detection level of the pick-up coil to a non-control level for a predetermined period of time after ignition, thus leading to the small delay characteristic as shown in FIG. 6. (about 1.6 degrees for 300 to 2500 r.p.m.)

The foregoing is the description of a series of operations of the ignition system in the absence of a retard signal. Next, the operation of the ignition system in the presence of a retard signal, namely, the operation of the retard circuit will be described.

Assume that an engine knocking or the like causes the retard signal generator circuit 307 to produce what is called knocking pulses of about 7 KHz. the retard signal/voltage converter circuit 308 produces a voltage in accordance with the number of knocking pulses. A waveform corresponding to the retard angle determined by this output voltage is produced, so that retard time pulses are produced from the retard circuit 310 and the transistor 202.

The voltage/retard angle converter circuit 309 generates a triangular wave as shown in FIG. 7(c), which triangular wave changes to increase the rise gradient thereof with the retard signal, while the fall gradient thereof is kept constant regardless of the magnitude of the retard signal or the r.p.m. The gradient of the triangular wave changes from rise to fall at a timing in synchronism with the turning on of the NPN transistor 9. The fall ends and is reversed to a rise when the predetermined level L4 is reached. The retard circuit 310 produces a pulse waveform with a pulse width of the fall part of the triangular waveform, so that the base voltage waveform of the transistor 202 corresponding to the output of the retard circuit is as shown in FIG. 7(d).

Specifically, at the time point when the waveform of the pick-up coil exceeds the operation level of the comparator circuit A comprising the transistors 6 and 7, the transistor 9 is turned off and the waveform shown in FIG. 7(b) is applied to the retard circuit. To facilitate the understanding, the relative level change of the two input signals to the comparator is shown in stepped form in FIG. 7(a). Actually, however, a more complicated level change is involved as a result of the effect of the various waveforms shown in FIGS. 4(a) to 4(g).

In synchronism with the turning on of the transistor 9, the gradient of the triangular wave generated at the voltage/retard converter rises, so that the retard circuit produces a pulse in synchronism with the fall part of this triangular wave as shown in FIG. 7(d).

The base voltage of the transistor 10, on the other hand, takes the form as shown in FIG. 7(e), and the base voltage of the transistor 202 takes the waveform as shown in FIG. 7(d). When these voltages are both at low level, the waveform of the collector voltage of the transistor 10 takes the form as shown in FIG. 7(f), and the waveform of the collector voltage of the transistor 15 is a reversal of the waveform of FIG. 7(f), so that the primary current Ic flows in the power transistor 200. As a result, the ignition plug 220 is fired at the timing of FIG. 7(h) when the primary current is cut off.

The capacitor 335 connected between the base and collector of the transistor 10 has a function to delay the turn off time of the transistor 10 by several μsec. This causes the transistor 202 to be turned on earlier than the turn off of the transistor 10, thus preventing the power transistor 200 from being instantaneously turned off at the time of turning off of the transistor 10.

The waveforms of FIGS. 8(a) to 8(h) which correspond to those of FIGS. 7(a) to 7(b) show the cases in which the output voltage $V_R$ of the retard signal/voltage converter is larger (namely, the retard is larger).

Figure 7:
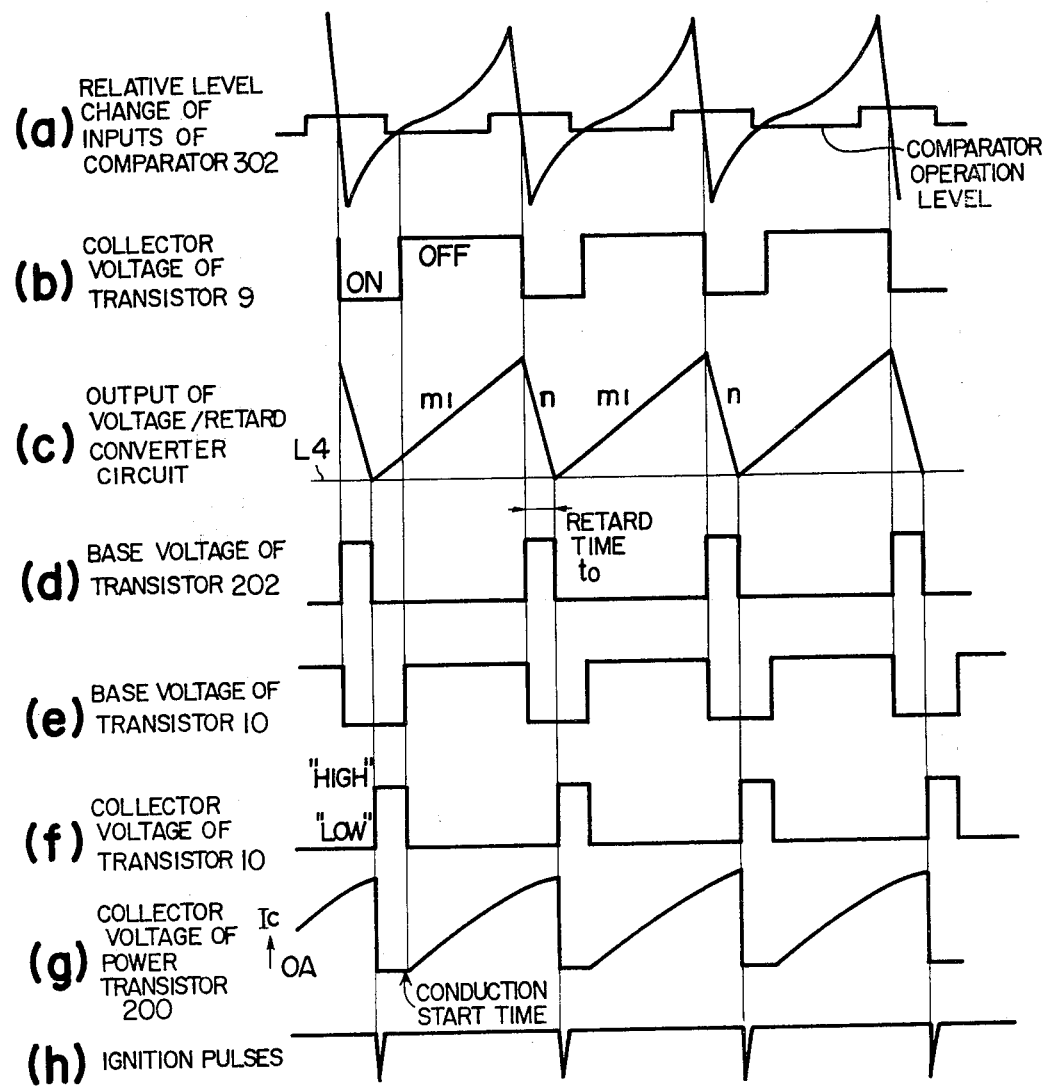
FIGS. 7 and 8 are diagrams showing the phase relation between the operation of the retard circuit and the primary current of the pick-up coil.
Figure 8:
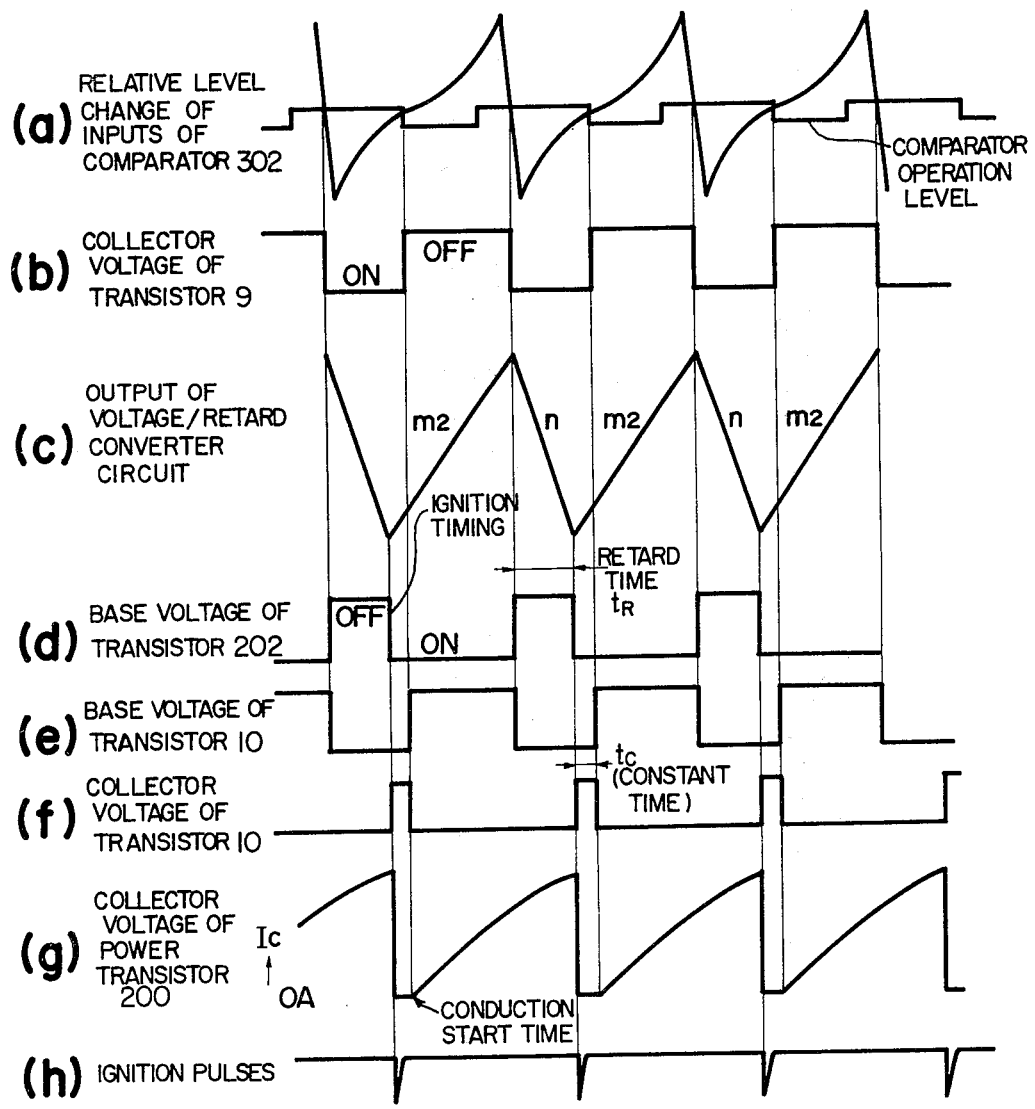

The great difference between FIGS. 7 and 8 lies in that in FIG. 8 the retard time $t_R$ is large and therefore the turn off time of the transistor 9 (conduction start time) is delayed behind that of FIG. 7 and the non-conduction time of the ignition coil 210 is determined by the constant time $t_C$.

This constant time $t_C$ depends on the operation of the duty increase input stop circuit for a predetermined period of time following ignition as shown in the block diagram of FIG. 1 and is substantially determined by the time constant due to the resistor 141 and the capacitor 172.

Specifically, when the voltage across the pick-up coil exceeds a predetermined value (in this case, the total sum of the voltages $V_{BE}$ of the diodes 47, 48, 49 and 50 and the transistor 17), the transistor 17 conducts so that the bistable circuit comprised of the transistors 16 and 17 is actuated. As a result, the transistor 19 conducts and the voltage stored in the capacitor 171 is prevented from being applied to the bias level change circuit. The transistor 19 continues to conduct until the transistor 13 is turned on, namely, until the power transistor 200 is turned off. In response to the turning on of the transistor 13, the transistor 22 is kept turned on until the end of the discharge of the capacitor 172 through the resistor 141. The bistable circuit including the transistors 16 and 17 is reset, and simultaneously with the turning on of the transistor 22, the transistor 16 is turned on. During the period when the transistor 22 is conducting, the transistor 18 is turned on and so is the transistor 19.

For this reason, the output voltage of the r.p.m./voltage converter circuit required for increasing the duty factor fails to be applied to the bias level change circuit for a predetermined period of time ($=t_C$) following the ignition, with the result that conduction does not start before the lapse of a predetermined length of time ($t_C$) after the ignition.

This operation cannot be attained only by providing means for turning on the transistor 19 for a predetermined period of time after ignition but by preventing a signal associated with the increase in duty factor from being applied to the bias level change circuit before the turning on of the output of the comparator (transistor 9).

Figure 9:
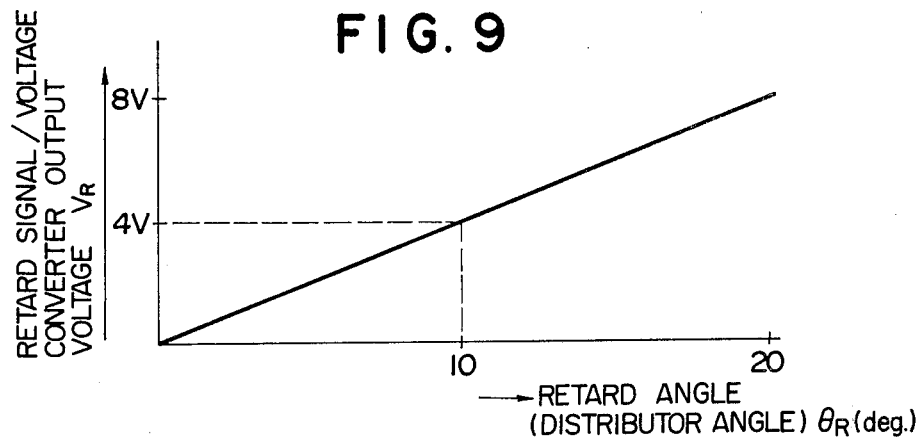
FIG. 9 is a diagram showing the relation between the retard signal and the output voltage of a voltage converter circuit.

The graph of FIG. 9 shows a retard characteristic as against the output voltage $V_R$ of the retard signal/voltage converter circuit. This embodiment involves a system in which the retard has a linear relation with the voltage $V_R$.

Figure 10:
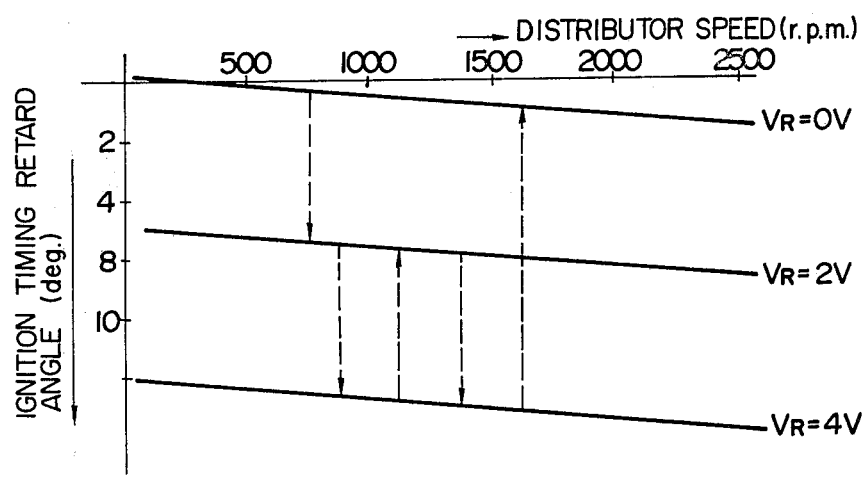
FIG. 10 shows the ignition timing retard characteristic corresponding to FIG. 9.

FIG. 10 shows the ignition time delay characteristic as against the change in $V_R$ and the same as FIG. 6 for $V_R = 0$. The value $V_R$ is not an analog one but a voltage changing stepwise. Therefore, with the increase in $V_R$, the ignition time retard is realized in steps as shown by dotted lines.

Figure 11:
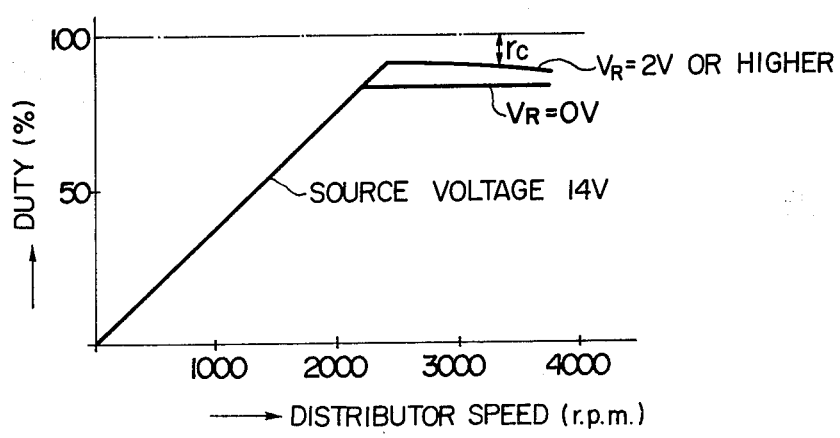
FIG. 11 is a diagram showing the duty characteristic corresponding to FIG. 9.

FIG. 11 shows a duty characteristic which is the same for the value $V_R = 0$ as for $V_t = 14$ V in FIG. 5. When $V_R$ takes a large value, however, the duty factor increases to a value of 100% less the percentage $r_C$% corresponding to the constant time $t_C$. In this embodiment, the maximum duty factor is about 82% for $V_R = 0$, and therefore the duty is substantially constant for $V_R$ of 2 V or higher. After ignition, power is not supplied for a substantially fixed time ($t_C \approx 1$ msec), and therefore, the duty for high engine speed decreases along a gradient as shown in FIG. 10 (the part for $V_R$ of 2 V or higher).

In conventional ignition systems lacking this function, the primary current cannot be cut off when the retard is large, resulting in an ignition failure or an intermittent ignition. Also, the gasoline in the cylinder has not a sufficient length of ignition time, thus leading to an ignition failure or other inconveniences. According to the present invention, by contrast, a satisfactory ignition is attained regardless of retard on the one hand and the simple construction thereof reduces the cost of the ignition system on the other hand.

It will be understood from the foregoing description that according to the present invention there is provided an ignition system simple in construction and wherein no ignition failure occurs even when the retard increases, thereby realizing a superior ignition.

I claim:

1. An ignition system for the internal combustion engine, comprising:
   (a) means for generating an electrical signal repeated in synchronism with the rotation of the engine;
   (b) timing means for providing a retard start timing signal and a conduction start timing signal on the basis of said electrical signal;
   (c) retard means for determining a retard time in accordance with the operating conditions of said engine and providing an ignition timing signal at a time point when said retard time has passed following said retard start timing signal;
   (d) conduction duty increasing means for advancing the timing of said conduction start timing signal in a manner to increase the conduction duty of the ignition coil depending on the revolutional speed of said engine;
   (e) power output means for starting the conduction of a current for storing in said ignition coil the electromagnetic energy required for producing an ignition pulse at the time of said conduction start timing signal, said power output means substantially cutting off said current at the time of said ignition timing signal; and (f) ignition security means for setting an ignition time required for generating said ignition pulse in response to said substantial cut-off of said ignition coil current, said ignition time starting from said ignition timing provided by said retard means, signal and including means for preventing said conduction duty increasing means from advancing the timing of said conduction start timing signal before the lapse of said ignition time.

2. An ignition system for the internal combustion engine according to claim 1, wherein said retard means includes means for generating a retard voltage for delaying the ignition timing signal in accordance with the operating conditions of said engine, and means actuated in response to said retard start timing signal for providing an ignition timing signal at a time point following the lapse of said retard time depending on said retard voltage.

3. An ignition system for the internal combustion engine according to claim 2, wherein said retard voltage generator means includes means for generating a retard signal based on the operating conditions of said engine and a converter for converting said retard signal into a retard voltage for delaying the ignition timing signal.

4. An ignition system for the internal combustion engine according to claim 2, wherein said ignition timing signal providing means changes the voltage level in one direction from a predetermined voltage level in proportion to said retard voltage at the final ignition timing, and including means for reversing the direction of change of said voltage level at said retard start timing, thus changing said voltage level at a fixed rate, said ignition timing signal providing means providing an ignition timing signal while at the same time reversing the direction of change of said voltage level to said one direction when said voltage level reaches said predetermined voltage level.

5. An ignition system for the internal combustion engine according to claim 1, wherein said electrical signal generator means includes an electromagnetic pick-up coil electromagnetically connected with a part rotation in relation to the revolutions of said engine.

6. An ignition system for the internal combustion engine according to claim 1, further comprising a current limiting circuit wherein when said ignition coil current reaches, after conduction start thereof, a predetermined critical value corresponding to the electromagnetic energy sufficient to provide an ignition pulse, said current is subsequently limited to said critical value.

7. An ignition system for the internal combustion engine according to claim 6, further comprising a circuit for retarding the timing of said conduction start timing signal depending on the period during which said ignition coil current is limited to said predetermined critical value.

8. An ignition system for the internal combustion engine comprising:
(a) means for generating an electrical signal repeated in synchronism with the rotation of the engine;
(b) comparator means for comparing said electrical signal with a reference voltage signal and providing an ignition coil conduction start timing signal at a time point when one signal exceeds the other signal, said comparator means including means for providing a retard start timing signal at a time point when said one signal is reduced below said other signal;
(c) retard means for determining a retard time in accordance with the operating conditions of said engine and providing an ignition timing signal at a time point immediately following the lapse of said retard time from said retard start timing signal;
(d) conduction duty increasing means for generating a first voltage signal depending on the r.p.m. of said engine, said voltage signal being supplied to said comparator means, thereby changing the level difference between the average voltage level of said electrical signal in said comparator means and said reference voltage signal level on the basis of said voltage signal, said conduction duty increasing means including means for advancing said conduction start timing signal in accordance with the increase in said r.p.m.;
(e) power output means for starting the conduction of a current for storing in said ignition coil the electromagnetic energy required for producing an ignition pulse at the timing of said conduction start timing signal, said power output means including means for substantially cutting off said current at the time of said ignition timing signal; and
(f) ignition security means for producing an ignition time required for generating said ignition pulse in response to said substantial cut off of said ignition coil current, said ignition time starting from said ignition timing provided by said retard means, and including means for preventing said conduction duty increasing means from advancing said conduction start timing before said lapse of said ignition time.

9. An ignition system for the internal combustion engine according to claim 8, wherein said ignition security means includes means for preventing said first voltage signal generated by said conduction duty increasing means from being applied to said comparator means until the lapse of said ignition time from a time point during the time period from said conduction start timing signal to said ignition timing signal.

10. An ignition system for the internal combustion engine according to claim 9, including means for preventing said voltage signal from being applied to said comparator means when said first voltage signal reaches a predetermined voltage level.

11. An ignition system for the internal combustion engine according to claim 8, further comprising current limiting means responsive to said ignition coil current, after conduction start, reaching a predetermined critical value corresponding to the electromagnetic energy sufficient to produce an ignition pulse for subsequently limiting said ignition coil current to said predetermined critical value.

12. An ignition system for the internal combustion engine according to claim 11, further comprising means for generating a second voltage signal depending on the period when said ignition coil current is limited to said predetermined critical value by said current limiting means, said second voltage signal generator means including means for supplying said second voltage signal to said comparator means and changing the relative level difference between the average voltage level of said electrical signal and said reference voltage signal level, thereby delaying said conduction start timing with the increase in said limiting period.

13. An ignition system for the internal combustion engine according to claim 12, wherein said first voltage signal changes the average voltage level of said electrical signal, and said second voltage signal changes said reference voltage signal level.

14. An ignition system for the internal combustion engine according to claim 8, wherein said conduction duty increasing means includes a series circuit including a first capacitor of a comparatively large capacity and a second capacitor of a comparatively small capacity, and means for charging said first capacitor through said second capacitor, said second capacitor being discharged in synchronism with the rotation of said engine, said first voltage signal being obtained from the terminal voltage of said first capacitor.

15. An ignition system for the internal combustion engine according to claim 14, wherein the discharge time of said second capacitor represents the ignition time provided at said ignition security means.

16. An ignition method for the internal combustion engine, comprising steps of:

(a) providing a retard start timing signal on the basis of an electrical signal repeated in synchronism with the rotation of said engine;

(b) determining a retard time in accordance with the operating conditions of said engine, providing an ignition timing signal at a time point immediately following the lapse of said retard time from said retard start timing signal, and substantially cutting off the conduction of the ignition coil current at the timing of said ignition timing signal;

(c) providing an ignition time required for generating said ignition pulse by said substantial cut-off of said ignition coil current, and maintaining said substantial cut-off of said ignition coil current from said ignition timing signal until the lapse of said ignition time; and (d) advancing the conduction start timing of said ignition coil provided on the basis of said electrical signal in accordance with the operating conditions of said engine, said conduction start timing being not advanced before the time point immediately following the lapse of said ignition time.

* * * * *